United States Patent [19]

Higashitsuji et al.

[11] Patent Number: 4,987,172

[45] Date of Patent: Jan. 22, 1991

[54] FLAME-RETARDANT SYNTHETIC RESIN COMPOSITION

[75] Inventors: Ken Higashitsuji; Hiroshi Kimoto, both of Kyoto; Yasunobu Takahashi, Habikino; Teruhisa Kojima, Takarazuka; Yutaka Nadehara, Yao, all of Japan

[73] Assignee: Marubishi Oil Chemical Co., Ltd., Osaka, Japan

[21] Appl. No.: 264,253

[22] Filed: Oct. 28, 1988

Related U.S. Application Data

[63] Continuation-in-part of Ser. No. 102,907, Sep. 30, 1987, abandoned.

[30] Foreign Application Priority Data

Jun. 5, 1987 [JP] Japan ................................ 62-139923

[51] Int. Cl.$^5$ .......................... C08K 3/32; C08L 79/04
[52] U.S. Cl. ................................... 524/416; 524/415; 524/417; 525/175; 525/176; 525/177
[58] Field of Search ........................ 524/416, 415, 417; 525/175, 176, 177

[56] References Cited

U.S. PATENT DOCUMENTS 4,198,493  4/1980  Marciandi ............................ 524/416

FOREIGN PATENT DOCUMENTS 1121936  4/1982  Canada ................................ 524/416
0037706  1/1981  European Pat. Off. .

*Primary Examiner*—Paul R. Michl
*Assistant Examiner*—Christopher P. Rogers
*Attorney, Agent, or Firm*—Burgess, Ryan & Wayne

[57] ABSTRACT

A flame-retardant synthetic resin composition comprising a thermoplastic resin selected from the group consisting of polyolefin, acrylonitrile-butadiene-styrene copolymer and ethylene-ethyl acrylate copolymer resins as a base polymer and, incorporated therein (A) a polyester fiber cut into a length smaller than 10 mm and/or a polyester powder having a particle size smaller than 10 mesh and (B) a polyphosphoric acid compound having a higher water resistance, wherein the amount of the thermoplastic resin is 40 to 95% by weight, the total amount of the components (A) and (B) is 5 to 60% by weight and the component (A)/component (B) weight ratio is in the range of from 5/1 to 1/20.

15 Claims, No Drawings

FLAME-RETARDANT SYNTHETIC RESIN COMPOSITION

CROSS-REFERENCES TO RELATED APPLICATIONS

This is a continuation-in-part of an application Ser. No. 102,907 filed on Sept. 30, 1987, now abandoned.

BACKGROUND OF THE INVENTION

1. Field of the Invention

The present invention relates to a flame-retardant synthetic resin composition. More particularly, the present invention relates to a halogen-free flame-retardant synthetic resin composition in which moldability (especially the parting property from a mold) is improved, the water resistance is enhanced, and the smoke-generating property is reduced.

2. Description of the Related Art

In general, synthetic resins have a light weight and are excellent in water resistance, chemical resistance, and electrical insulation characteristics and can be easily molded and processed. Therefore, synthetic resins are widely used as materials for electric appliances, materials for automobiles, construction materials, and the like. However, synthetic resins are generally defective in that they are easily burnt.

Accordingly, there have been proposed various methods for rendering synthetic resins flame-retardant. The method of internal addition of a halogen compound such as decabromodiphenylether or a halogen compound and antimony trioxide to synthetic resins is most widely adopted (see Japanese Examined Patent Publication No. 50-5103). Furthermore, there can be mentioned a method of addition of a metal hydroxide (Japanese Unexamined Patent Publication No. 50-34643, No. 50-133247, and No. 51-128194), a method of addition of a metal hydroxide and a polyphosphoric acid compound in combination (Japanese Unexamined Patent Publication No. 54-22450), and a method of addition of an inorganic compound (Plastic Compounding, 15, July–August, 1986). Moreover, there can be mentioned a method in which a polyhydric alcohol such as pentaerythritol is used in combination with a polyphosphoric acid compound, urea, melamine, or the like for rendering a synthetic resin flame-retardant by utilizing the heat-insulating action of an intumescent and carbonized layer at the combustion and inhibiting the conduction of heat to the substrate (Japanese Examined Patent Publication No. 61-47875 corresponding to U.S. Pat. No. 4,198,493 and Japanese Unexamined Patent Publication No. 60-36542).

However, these conventional techniques involve various problems. For example, in the case where a halogen compound is used, the hydrogen halide or the like generated by thermal decomposition corrodes the mold or the like at the molding or processing step, or, when a fire breaks out, evacuation is inhibited by generation of noxious odors or poisonous gas. Furthermore, it has recently been reported that there is a risk of formation of dioxine as a thermal decomposition product of halogen compounds [Environ. Sci. Technol., 20(4), 404–408, (1986)]. Especially in West Germany, there is observed a trend toward the control of use of halogen compounds. In the case where an inorganic compound such as a polyphosphoric acid compound or a metal hydroxide is used, the flame-retardant effect is low and the inorganic compound should be added in a large amount. Therefore, the specific gravity of the synthetic resin composition is increased and physical properties such as the strength and impact resistance are degraded.

Intumescent type flame-retardants comprising polyphosphoric acid compound, polyhydric alcohols and the like, which have been extensively studied and practically marketed, are defective in that since most of these compounds have a high hygroscopicity and polyhydric alcohols are generally water-soluble, the resin compositions comprising these compounds fail to have the high water resistance required for synthetic resins, the parting property from a mold is poor, and the molding efficiency is drastically reduced.

Various trials have been made to overcome these defects, but not satisfactory results have been obtained.

SUMMARY OF THE INVENTION

It is a primary object of the present invention to overcome the above-mentioned defects of the conventional techniques and provide a flame-retardant synthetic resin composition in which generation of noxious or corrosive gas such as a hydrogen halide at the molding or processing step or the incineration step is prevented by rendering the composition intumescent and halogen-free, the parting property from a mold is improved, a practically sufficient water resistance is manifested, an excellent flame-retardant effect is attained by using the flame retardant in an amount much smaller than the amount used of the conventional halogen compound or inorganic compound, and generation of smoke is drastically reduced.

We made research with a view to solving the above-mentioned problem, and, as a result, have now completed the present invention.

More specifically, in accordance with the present invention, there is provided a flame-retardant synthetic resin composition comprising a thermoplastic resin selected from the group consisting of polyolefin, acrylonitrile-butadiene-styrene copolymer and ethylene-ethyl acrylate copolymer resins as the base polymer and, incorporated therein (A) a polyester fiber cut into a length smaller than 10 mm and/or a polyester powder having a particle size smaller than 10 mesh and (B) a polyphosphoric acid compound having a high water resistance, wherein the amount of the thermoplastic resin is 40 to 95% by weight, the total amount of the components (A) and (B) is 5 to 60% by weight and the component (A)/component (B) weight ratio is in the range of from 5/1 to 1/20.

DESCRIPTION OF THE PREFERRED EMBODIMENTS

The flame-retardant synthetic resin composition of the present invention is characterized in that no halogen compound with problems in toxicity and regulation are used, the water resistance and mold parting property, which are insufficient in the conventional halogen-free flame-retardant synthetic resin compositions, are improved, and generation of gases or smoke at the molding step or at the time of combustion is drastically reduced. Namely, the present invention provides a so-called intumescent type flame-retardant synthetic resin composition in which, at the time of combustion, the burnt portion of the synthetic resin is intumescent and carbonized to form a porous carbonized layer acting as a heat-insulating layer, conduction of heat to the substrate is inhibited by this porous carbonized layer to prevent combustion, and generation of smoke is therefore prevented.

In the conventional intumescent flame-retardant synthetic resin compositions, polyhydric alcohols and derivatives thereof are mainly used as the intumescent and carbonizing source. According to the present invention, by using a polyester fiber or polyester powder instead of such a polyhydric alcohol or a derivative thereof, the water resistance, which is insufficient in the conventional intumescent flameretardant synthetic resin compositions, is drastically improved. Furthermore, a polyphosphoric acid compound having a high water resistance is used as the carbonizing and intumescent catalyst in the present invention.

If the total amount of the components (A) and (B) is not larger than 5% by weight, the flame-retardant effect is low, and if the total amount of the components (A) and (B) exceeds 60% by weight, the physical properties and processability of the composition are drastically degraded, and the inherent characteristics of the synthetic resin composition are not sufficiently exhibited. If the (A)/(B) weight ratio is outside the range of from 5/1 to 1/20, the balance of the flame retardancy is not good. It is preferred that the total amount of the components (A) and (B) be 10 to 50% by weight, especially 15 to 40% by weight.

The typical example of the polyolefin resin usable for the base polymer in the present invention includes polyethylene and polypropylene. The monofilament denier of the polyester fiber is preferably smaller than 15 and especially preferably smaller than 10. The size of the polyester powder is preferably smaller than 20 mesh and especially preferably smaller than 50 mesh. It is indispensable that the polyester fiber or polyester powder should not completely be molten at the molding step but should be softened and molten at the time of combustion. Generally, a polyester fiber or polyester powder have a softening point higher than the softening point of the base polymer and is capable of being softened and molten at a temperature lower than the combustion temperature.

When the polyester fiber is added to the base polymer, the adaptability to the molding operation and the dispersibility in the base polymer should be taken into consideration, and if the cut length of the polyester fiber exceeds 10 mm, the dispersion in the base polymer is insufficient and bad influences are imposed on the flame retardancy and physical properties. Accordingly, the cut length of the polyester fiber should be smaller than 10 mm, preferably smaller than 7.5 mm, especially preferably smaller than 5 mm. In order to further improve the operation adaptability and the dispersibility, it is preferred that a bundle formed by bundling a polyester fiber having a monofilament denier smaller than 20, especially smaller than 15, with an adhesive polymer be used. A water-dispersible, water-soluble or solvent-soluble polymer having a good compatibility with the base polymer is preferably used as the adhesive polymer. For example, there can be mentioned thermoplastic resins such as ethylene-vinyl acetate, polyvinyl acetate, polyamides, ethylene/vinyl chloride copolymers, ethylene/vinyl acetate/vinyl chloride copolymers, ethylene/ethyl acrylate copolymers, polyesters, and atactic polypropylene.

Polyphosphoric acid compounds having a high water resistance, such as amidopolyphosphoric acids, ammonium polyphosphates, high condensates of amidophosphoric acid, and carbamyl polyphosphates are preferably used as the polyphosphoric acid compound in the present invention.

Additives such as a lubricant, a plasticizer, an antioxidant, and an ultraviolet absorbent can be added to the synthetic resin composition of the present invention according to need.

The synthetic resin composition of the present invention may be formed into a molded article having an arbitrary shape according to an ordinary molding method, for example, an injection molding method, an extrusion molding method, or a compression molding method. The synthetic resin composition of the present invention can be used for the production of parts of electric appliances, auto parts, interior articles, construction materials, clothing articles, miscellaneous articles, and the like.

According to the present invention, a flame-retardant synthetic resin composition which is excellent in moldability and processability, especially the parting property, and water resistance, and in which generation of smoke is reduced and generation of noxious odors or poisonous gas is prevented, is provided.

The present invention will now be described in detail with reference to the following non-limitative examples.

EXAMPLE 1

A mixture comprising 66% by weight of polypropylene (J815HK supplied by Ube Industries Ltd., Japan), 27% by weight of an amidopolyphosphoric acid (Sumisafe PM supplied by Sumitomo Chemical Co., Ltd., Japan) and 7% by weight of a polyester fiber having a monofilament denier of 2 and cut into 3 mm length (supplied by Unitika) was kneaded at 180° C. for 15 minutes by a kneader (Model PBV-03 supplied by Irie Shokai Kabushiki Kaisha, Japan) and the kneaded mixture was pressed at 200° C. for 3 minutes under 100 kg/cm$^2$ to form a plate having a thickness of 3 mm.

The obtained plate was subjected to a combustion test and a water resistance test.

EXAMPLE 2

A mixture comprising 69% by weight of polypropylene (J815HK supplied by Ube Industries Ltd., Japan), 26% by weight of a high condensate of amidophosphoric acid (Taien-S supplied by Taihei Kagaku Sangyo Kabushiki Kaisha, Japan) and 5% by weight of a polyester fiber having a monofilament denier of 2.1 and cut into 1 mm length (supplied by Unitika) was kneaded at 180° C. for 15 minutes by a kneader as used in Example 1 and the kneaded mixture was pressed at 200° C. for 3 minutes under 100 kg/cm$^2$ to form a plate having a thickness of 3 mm or 1 mm.

The obtained plate of 3 mm thickness was subjected to a combustion test and a water resistance test and the plate of 1 mm thickness was subjected to a smoke-generating test.

EXAMPLE 3

The procedure as in Example 2 was repeated, except that a polyester fiber bundle was used instead of the polyester fiber. The polyester fiber bundle was prepared by bundling a polyester fiber as used in Example 2 using a saturated polyester (UE-3221 supplied by Unitika, Japan) as the adhesive polymer.

EXAMPLE 4

The procedure as in Example 4 was repeated, except that a polyester powder was used instead of the polyester fiber. The polyester powder was prepared by freezing and powdering polyester pellet (RY533 supplied by Nippon Unipet Co., Japan) into a size of 80 to 100 mesh.

EXAMPLE 5

The procedure as in Example 2 was repeated, except that the polypropylene was used in an amount of 60% by weight instead of 69% by weight, 30% by weight of an ammonium polyphosphate (Exolit 422 supplied by Hoechst A.G.) was used instead of 26% by weight of the high condensate of amidophosphoric acid, and 10% by weight of a polyester fiber having a monofilament denier of 1.0 and cut into 1 mm length (supplied by Unitika) was used instead of 5% by weight of the polyester fiber.

EXAMPLE 6

The procedure as in Example 5 was repeated, except that an ammonium polyphosphate supplied by Monsanto Chemical Co. under the trade name of Phos-Chek P/30 was used, and a polyester fiber having a monofilament denier of 0.3 and cut into 1 mm length (supplied by Unitika) was used instead of the polyester fiber.

EXAMPLE 7

A plate was formed and tested in an analogous manner as in Example 2, using a mixture comprising 60% by weight of low-density polyethylene (M420 supplied by Mitsubishi Chemical Industries Ltd., Japan), 30% by weight of a high condensate of amidophosphoric acid as used in Example 2 and 10% by weight of a polyester fiber as used in Example 2. The kneading was carried out at 170° C. for 15 minutes.

EXAMPLE 8

The procedure as in Example 7 was repeated, except that an ethylene-ethyl acrylate copolymer (NUC-6170 supplied by Nippon Unicar Co.) was used instead of the low density polyethylene, and an ammonium polyphosphate as used in Example 5 was used instead of the high condensate of amidophosphoric acid.

EXAMPLE 9

A plate was formed and tested in an analogous manner as in Example 2, using a mixture comprising 55% by weight of an ABS resin (Kralastic K-3272M supplied by Sumitomo Naugatuck Kabushiki Kaisha, Japan), 35% by weight of a high condensate of amidophosphoric acid as used in Example 2 and 10% by weight of a polyester fiber as used in Example 2. The kneading was carried out at 200° C. for 15 minutes.

COMPARATIVE EXAMPLE 1

A mixture comprising 70% by weight of polypropylene as used in Example 1, 24% by weight of decabromodiphenylether (Nonnen DP-10F supplied by Marubishi Oil Chemical Co., Ltd.), and 6% by weight of antimony trioxide (supplied by Mikuni Seiren Kabushiki Kaisha) was kneaded at 180° C. for 15 minutes by a kneader. The kneaded mixture was pressed at 200° C. for 3 minutes to form a plate having a thickness of 3 mm or 1 mm.

The so-obtained plate was subjected to a combustion test, a water resistance test, and a smoke-generating test.

TEST RESULTS

1. Results of Combustion Test and Parting Property

The results of the combustion test according to the UL-94 test method and the results of the test of the parting property from a mold are shown in Table 1.

TABLE 1

|  | Total amount of additives (%) | UL-94 | Parting property |
| --- | --- | --- | --- |
| Comparative Example 1 | 30 | fail | good |
| Example 1 | 34 | V-0 | good |
| Example 2 | 31 | V-0 | good |
| Example 3 | 31 | V-0 | good |
| Example 4 | 31 | V-0 | good |
| Example 5 | 40 | V-0 | good |
| Example 6 | 40 | V-0 | good |
| Example 7 | 40 | V-0 | good |
| Example 8 | 40 | V-0 | good |
| Example 9 | 45 | V-0 | good |

*Plastic Compounding, 15 (July–August 1986)
**Mg(OH)$_2$

2. Results of Water Resistance Test

A sample was boiled for 60 minutes in boiling water and dried at 80° C. for 30 minutes, and the weight decrease of the sample was measured. The obtained results are shown in Table 2. Incidentally, even if boiling was conducted for more than 60 minutes, no further change of the weight was observed.

Five samples having a size of 150 mm×13 mm ×3 mm were cut from a plate having a size of 150 mm ×150 mm×3 mm by a cutter, and the five samples were simultaneously tested. Although the cut surfaces were inferior to other surfaces in smoothness because of cutting by the cutter, these samples were tested without further treatment.

TABLE 2

|  | UL-94 | | Weight decrease (%) | Appearance after boiling |
| --- | --- | --- | --- | --- |
|  | before boiling | after boiling | | |
| polypropylene | fail | fail | 0.0 | not changed |
| Comparative Example 1 | fail | fail | 0.0 | slight color change on cut surface |
| Example 1 | V-0 | V-0 | 0.2 | slight color change on cut surface |
| Example 2 | V-0 | V-0 | 0.1 | |
| Example 3 | V-0 | V-0 | 0.1 | |
| Example 4 | V-0 | V-0 | 0.2 | |
| Example 5 | V-0 | V-0 | 0.3 | |
| Example 6 | V-0 | V-0 | 0.2 | |
| Example 7 | V-0 | V-0 | 0.1 | |
| Example 8 | V-0 | V-0 | 0.1 | |
| Example 9 | V-0 | V-0 | 0.1 | |

3. Results of Smoke-Generating Test

The surface test was carried out according to the method of Official Notice No. 1828 and 1231 of the Ministry of Construction (JIS A-1321-1975). A sample having a size of 220 mm×220 mm×1 mm and a weight of 180 to 190 g was used. The obtained results are shown in Table 3.

TABLE 3

| | CA value |
|---|---|
| Polypropylene | 18 |
| Polyethylene | 20 |
| Ethylene-ethyl acrylate copolymer | 20 |
| ABS resin | 25 |
| Comparative Example 1 | above 240 |
| Example 1 | — |
| Example 2 | 48 |
| Example 3 | 50 |
| Example 4 | 50 |
| Example 5 | 53 |
| Example 6 | 55 |
| Example 7 | 51 |
| Example 8 | 55 |
| Example 9 | 58 |

We claim:

1. A flame-retardant synthetic resin composition comprising a thermoplastic resin selected from the group consisting of polyolefin, acrylonitrile-butadiene-styrene copolymer and ethylene-ethyl acrylate copolymer resins as a base polymer and, incorporated therein, (A) a polyester fiber cut into a length smaller than 10 mm and/or a polyester powder having a particle size smaller than 10 mesh and (B) a polyphosphoric acid compound having a high water resistance, wherein the amount of the thermoplastic resin is 40 to 95% by weight, the total amount of the components (A) and (B) is 5 to 60% by weight, and the component (A)/component (B) weight ratio is in the range of from 5/1 to 1/20.

2. A composition according to claim 1, wherein the total amount of the components (A) and (B) is 10 to by weight.

3. A composition according to claim 2, wherein the total amount is 15 to 40% by weight.

4. A composition according to claim 1, wherein the monofilament denier of the polyester fiber is smaller than 15.

5. A composition according to claim 4, wherein the monofilament denier is smaller than 10.

6. A composition according to claim 1, wherein the particle size of the polyester powder is smaller than 20 mesh.

7. A composition according to claim 6, wherein the particle size is smaller than 50 mesh.

8. A composition according to claim 1, wherein the polyester fiber has a length of smaller than 7.5 mm.

9. A composition according to claim 8, wherein the length is smaller than 5 mm.

10. A composition according to claim 1, wherein the polyester fiber or powder has a softening point higher than the softening point of the base polymer and is softened and melted before carbonization at the combustion.

11. A composition according to claim 1, wherein the polyester fiber is one that has been bundled by an adhesive polymer and cut into a length smaller than 10 mm.

12. A composition according to claim 11, wherein the monofilament denier of the organic fiber is smaller than 20.

13. A composition according to claim 12, wherein the monofilament denier is smaller than 15.

14. A composition according to claim 11, wherein the adhesive polymer is selected from ethylene-vinyl acetate copolymers, polyvinyl acetate, polyamides, ethylene-vinyl chloride copolymers, ethylene-vinyl acetate-vinyl chloride copolymers, ethylene-ethyl acrylate copolymers, polyesters, and atactic polypropylene.

15. A composition according to claim 1, wherein the polyphosphoric acid compound is selected from amidopolyphosphoric acids, ammonium polyphosphates, high condensates of amidophosphoric acid, and carbamyl polyphosphates.

* * * * *